United States Patent
Kim

(10) Patent No.: US 9,523,340 B2
(45) Date of Patent: Dec. 20, 2016

(54) APPARATUS FOR CONTROLLING ENGINE OF VEHICLE AND METHOD THEREOF

(71) Applicants: Hyundai Motor Company, Seoul (KR); Kia Motors Corporation, Seoul (KR)

(72) Inventor: Hyun Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 5 days.

(21) Appl. No.: 14/814,100

(22) Filed: Jul. 30, 2015

(65) Prior Publication Data

US 2016/0281671 A1 Sep. 29, 2016

(30) Foreign Application Priority Data

Mar. 23, 2015 (KR) .................. 10-2015-0040064

(51) Int. Cl.
| | | |
|---|---|---|
| F01N 3/18 | (2006.01) | |
| F02P 5/04 | (2006.01) | |
| F01N 3/20 | (2006.01) | |
| F01N 11/00 | (2006.01) | |
| F01N 13/00 | (2010.01) | |

(Continued)

(52) U.S. Cl.
CPC .............. F02P 5/045 (2013.01); F01N 3/20 (2013.01); F01N 11/002 (2013.01); F01N 13/008 (2013.01); F02D 41/0005 (2013.01); F02D 41/3005 (2013.01); F01N 3/2046 (2013.01); F01N 2430/06 (2013.01); F01N 2430/08 (2013.01); F01N 2560/06 (2013.01); F01N 2900/0422 (2013.01); F01N 2900/08 (2013.01); F01N 2900/1602 (2013.01);

(Continued)

(58) Field of Classification Search
CPC .. F01N 3/2046; F01N 11/002; F01N 2430/06; F01N 2430/08; F01N 2560/06; F01N 2900/0422; F01N 2900/08; F01N 2900/1602; F02D 2041/0265; F02D 41/1446; F02D 2200/0802; F02D 2250/18; Y02T 10/47
USPC .................................. 60/274, 277, 285, 320
See application file for complete search history.

(56) References Cited

U.S. PATENT DOCUMENTS

| | | | | |
|---|---|---|---|---|
| 5,609,218 A | * | 3/1997 | Yamashita ........... | B60K 28/165 180/197 |
| 6,244,244 B1 | * | 6/2001 | Fuwa ...................... | F02D 37/02 123/295 |
| 2015/0151759 A1 | | 6/2015 | Oyama et al. | |

FOREIGN PATENT DOCUMENTS

| | | |
|---|---|---|
| JP | 2002-256863 A | 9/2002 |
| JP | 2003-293921 A | 10/2003 |

(Continued)

OTHER PUBLICATIONS

Office Action issued in correponding Korean Patent Applicaton No. 10-2015-0040064, mailed on Apr. 12, 2016; 4 pages.

*Primary Examiner* — Jorge Leon, Jr.
(74) *Attorney, Agent, or Firm* — McDermott Will & Emery LLP

(57) ABSTRACT

The present disclosure provides an apparatus for controlling an engine of a vehicle and a method thereof, and more particularly, provides an apparatus for controlling an engine of a vehicle and a method thereof capable of preventing damage on catalyst occurring upon controlling engine torque by controlling the engine torque based on an accumulated time of a torque decrease request from an ESC system or a TCS while monitoring temperature of the catalyst.

10 Claims, 4 Drawing Sheets

(51) Int. Cl.
*F02D 41/30* (2006.01)
*F02D 41/00* (2006.01)
*F02D 41/02* (2006.01)

(52) U.S. Cl.
CPC ............... *F02D 2041/0265* (2013.01); *F02D 2200/0802* (2013.01); *F02D 2250/18* (2013.01)

(56) References Cited

FOREIGN PATENT DOCUMENTS

| | | |
|---|---|---|
| JP | 2010-053828 A | 3/2010 |
| JP | H05-044557 A | 2/2013 |
| JP | 10-2014-073693 A | 4/2014 |
| KR | 10-2005-0023553 A | 3/2005 |
| KR | 10-2010-0008983 A | 1/2010 |

* cited by examiner

APPARATUS FOR CONTROLLING ENGINE OF VEHICLE AND METHOD THEREOF

CROSS-REFERENCE TO RELATED APPLICATION

This application is based on and claims the benefit of priority to Korean Patent Application No. 10-2015-0040064, filed on Mar. 23, 2015 in the Korean Intellectual Property Office, the disclosure of which is incorporated herein in its entirety by reference.

TECHNICAL FIELD

The present disclosure relates to an apparatus for controlling an engine of a vehicle and a method thereof, and more particularly, to a technology for controlling engine torque without damaging a catalyst in a vehicle in which an electronic stability control (ESC) system or a traction control system (TCS) is mounted.

BACKGROUND

In general, an ESC system stably maintains an attitude of a vehicle in an emergency situation by sensing wheel velocity, yaw moment, a steering angle, pressure of accelerator/brake pedal, and the like of the vehicle to optimally control braking power of each wheel.

When vehicle speed and lateral acceleration during driving satisfy reference conditions (e.g., vehicle speed of 40 KPH or more, lateral acceleration 0.6 g or more), the ESC system requests an engine control unit (ECU) to increase or decrease engine torque in order to secure driving stability of the vehicle.

Meanwhile, a traction control system (TCS) prevents driving wheels from being spun when the vehicle starts, accelerates, or climbs on a slippery road, thereby allowing the vehicle to be stably maintained on an X axis (an axis in a lengthwise direction) line.

The TCS also maintains cornering stability, and requests the engine control unit (ECU) to increase or decrease the engine torque in order to prevent the wheels of a driving shaft of the vehicle from being spun aside, which causes a track departure.

If the ECU receives a continuous torque decrease request from the ESC system or the TCS, the ECU rapidly performs a torque control by considering that the continuous torque decrease request of the ESC system is directly linked with stability of the vehicle. That is, the ECU retards an ignition timing or cut fuel by rapidly performing torque control, so as to decrease the engine torque.

The retardation of the ignition timing described above increases temperature of exhaust gas to thereby excessively increase temperature of catalyst, and the cut of the fuel causes air and the catalyst to be directly in contact with each other to thereby excessively increase the temperature of the catalyst, which cause dissolution of the catalyst (damage of the catalyst).

Since an apparatus for controlling an engine according to the related art decreases the engine torque by simply retarding the ignition timing or cutting the fuel upon receiving the torque decrease request from the ESC system or the TCS, there is a problem that the damage of the catalyst performing a function purifying the exhaust gas of the vehicle is caused.

SUMMARY

The present disclosure has been made to solve the above-mentioned problems occurring in the prior art while advantages achieved by the prior art are maintained intact.

An aspect of the present disclosure provides an apparatus for controlling an engine of a vehicle and a method thereof capable of preventing damage on catalyst occurring upon controlling engine torque by controlling the engine torque based on an accumulated time of a torque decrease request from an ESC system or a TCS while monitoring temperature of the catalyst.

Particularly, an aspect of the present disclosure prevents temperature of catalyst from being excessively increased by optimally adjusting an ignition timing, an amount of air, and an amount of fuel based on an accumulated time of a torque decrease request from an ESC system or a TCS while monitoring the temperature of the catalyst.

The objects of the present disclosure are not limited to the above-mentioned objects, and other objects and advantages of the present disclosure can be appreciated by the following description and will be clearly described by the embodiments of the present disclosure. In addition, it will be easily known that the objects and advantages of the present disclosure can be implemented by means and a combination thereof shown in the appended claims.

According to an exemplary embodiment of the present disclosure, an apparatus for controlling an engine of a vehicle includes a temperature sensor configured to sense a temperature of catalyst; a receiver configured to continuously receive a torque decrease request; and an engine controller configured to control the engine to retard an ignition timing as the torque decrease request is received through the receiver and control the engine to decrease engine torque by advancing the retarded ignition timing and adjusting an amount of air and an amount of fuel when the temperature of the catalyst exceeds a threshold temperature and an accumulation time of the torque decrease request exceeds a threshold time.

According to another exemplary embodiment of the present disclosure, a method for controlling an engine of a vehicle includes counting an accumulation time of a torque decrease request and retarding an ignition timing upon receiving the torque decrease request; maintaining the retardation of the ignition timing when a temperature of catalyst does not exceed a threshold temperature and checking whether or not the accumulation time of the torque decrease request exceeds a threshold time when the temperature of the catalyst exceeds the threshold temperature; maintaining the retardation of the ignition timing when the accumulation time of the torque decrease request does not exceed the threshold time as a result of the checking; and advancing the ignition timing and adjusting an amount of air and an amount of fuel when the accumulation time of the torque decrease request exceeds the threshold time as the result of the checking.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
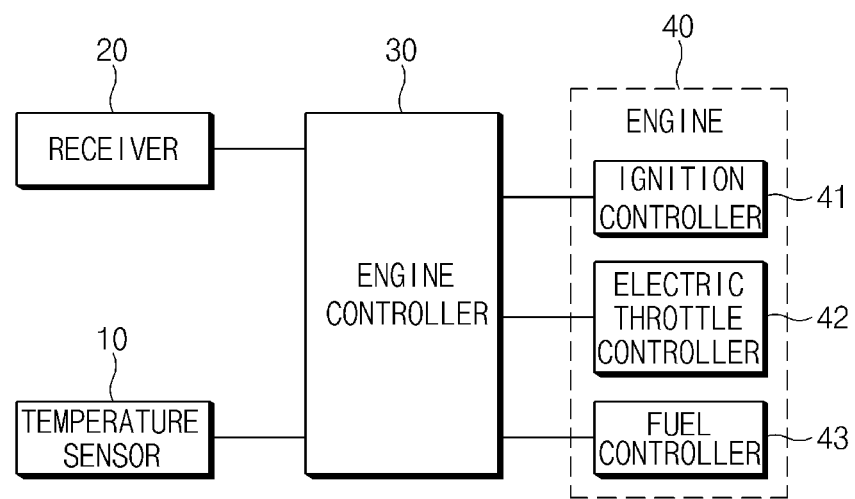
FIG. 1 is a configuration diagram of an apparatus for controlling an engine of a vehicle according to an exemplary embodiment of the present disclosure.

FIG. 1 is a configuration diagram of an apparatus for controlling an engine of a vehicle according to an exemplary embodiment of the present disclosure.

As illustrated in FIG. 1, the apparatus for controlling the engine of the vehicle according to the present disclosure includes a temperature sensor 10, a receiver 20, and an engine controller 30 for controlling an engine 40.

Each of the respective components will be described. First, the temperature sensor 10 senses a temperature of catalyst.

The receiver 20 receives a torque decrease request from an ESC system or a TCS. Here, in general, the ESC system or the TCS continuously requests a torque decrease until torque reaches target torque.

The receiver 20 may also directly receive the torque decrease request from the ESC system or the TCS and may also receive the torque decrease request via a network of the vehicle. The torque decrease request is received in a message form.

Here, the network of the vehicle includes a controller area network (CAN), a local interconnect network (LIN), a flexray, a media oriented system transport (MOST), and the like.

The engine controller 30 performs a general control of an engine 40.

Particularly, when the engine controller 30 receives the torque decrease request from the ESC system or the TCS via the receiver 20, the engine controller 30 controls the engine 40 to operate an own timer and retard an ignition timing. In this case, an ignition controller 41 in the engine 40 adjusts the ignition timing according to the control of the engine controller 30.

Hereinafter, a relationship between timing retardation of an ignition timing and an engine torque ratio will be described with reference to FIG. 2.

Figure 2:
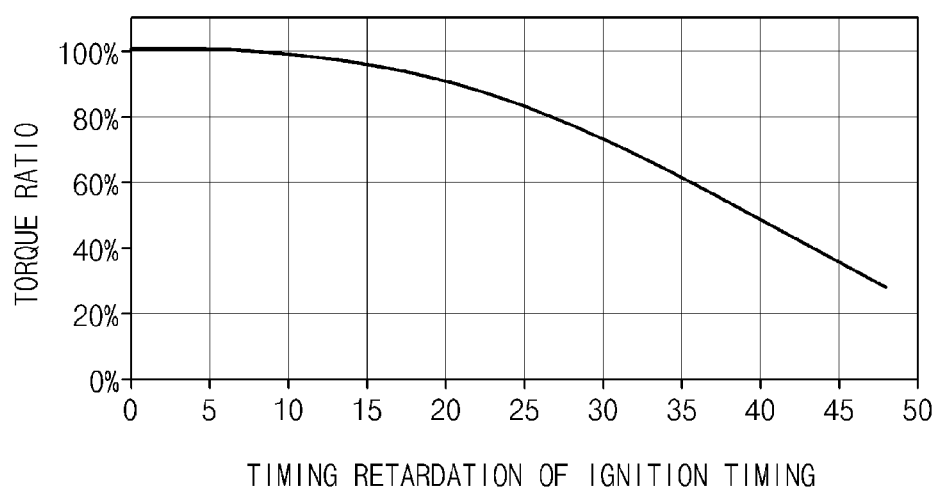
FIG. 2 is an illustrative diagram illustrating a relationship between timing retardation of an ignition timing and an engine torque ratio which are used in the present disclosure.

FIG. 2 is an illustrative diagram illustrating a relationship between timing retardation of an ignition timing and an engine torque ratio which are used in the present disclosure, wherein a horizontal axis illustrates the timing retardation of the ignition timing (unit:degree) and a vertical axis illustrates the engine torque ratio.

In FIG. 2, a case in which the timing retardation of the ignition timing is 0 corresponds to a case in which the ignition timing is not retarded, at which the engine torque ratio becomes 100%. However, when the timing retardation of the ignition timing becomes 35 degree, the engine torque ratio becomes about 60%, which is value decreased about 40%.

As a result, it may be appreciated from FIG. 2 that engine torque is decreased as the timing retardation of the ignition timing is increased in a predetermined range.

In addition, the engine controller 30 monitors the temperature of the catalyst sensed by the temperature sensor 10, and when the temperature of the catalyst exceeds a threshold temperature (e.g., 850° C.) and an accumulation time of the torque decrease request exceeds a threshold time, the engine controller 30 advances the retarded ignition timing and adjusts an amount of air and an amount of fuel to decrease the engine torque.

In this case, the engine controller 30 decreases the engine torque by decreasing the amount of air supplied to the engine through an electric throttle controller (ETC) 42 in the engine. In this case, the engine controller 30 decreases the engine torque by adjusting an air fuel ratio through a fuel controller 43 in the engine.

Hereinafter, a relationship between the air fuel ratio and the torque ratio will be described with reference to FIG. 3.

Figure 3:
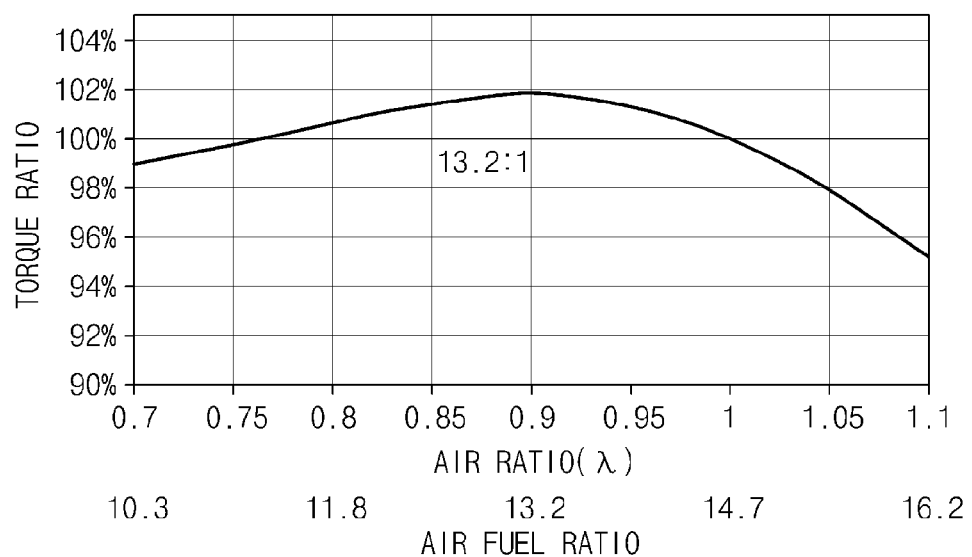
FIG. 3 is an illustrative diagram illustrating a relationship between an air fuel ratio and a torque ratio which are used in the present disclosure.

FIG. 3 is an illustrative diagram illustrating a relationship between an air fuel ratio and a torque ratio which are used in the present disclosure, wherein a horizontal axis illustrates the air fuel ratio and an air ratio $\lambda$ and a vertical axis illustrates the engine torque ratio.

It may be appreciated from FIG. 3 that the maximum torque ratio occurs when the air fuel ratio has a ratio of 13.2 (fuel):1 (air). However, combustion is generally performed at a condition of 14.7:1 having the most purification efficiency of the catalyst.

It may be appreciated from FIG. 3 that when the amount of fuel is adjusted, the engine torque may be decreased.

In addition, when the temperature of the catalyst is decreased to the threshold temperature or less, the engine controller 30 decreases the engine torque by stopping the control of the amount of air and the amount of fuel and retarding the ignition timing.

As a result, when the temperature of the catalyst does not exceed the threshold temperature, the engine controller 30 decreases the engine torque according to a conventional method, and when the temperature of the catalyst exceeds the threshold temperature, the engine controller 30 decreases the engine torque by advancing the ignition timing and adjusting the amount of air and the amount of fuel described above in a case in which the accumulation time of the torque decrease request exceeds the threshold time, as an additional condition.

According to the present disclosure, the accumulation time of the torque decrease request is an accumulation time from a time at which the torque decrease request is firstly received to a current timing at which the torque decrease request is received. For example, if the torque decrease request is also received at the current timing elapsed by 10 ms from the time at which the torque decrease request is firstly received, the accumulation time of the torque decrease request is 10 ms.

Figure 4:
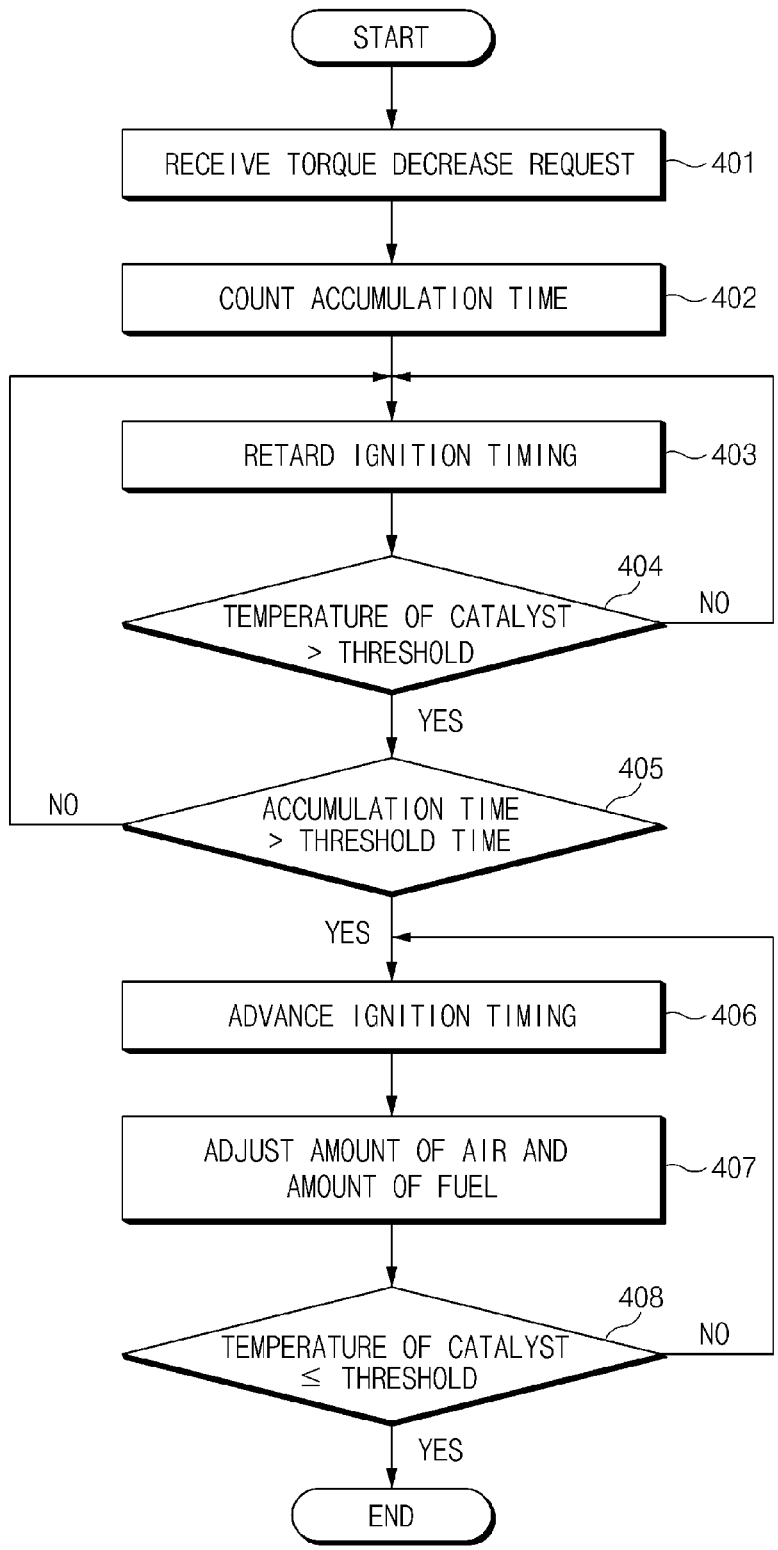
FIG. 4 is a flow chart of a method for controlling an engine of a vehicle according to an exemplary embodiment of the present disclosure.

FIG. 4 is a flow chart of a method for controlling an engine of a vehicle according to an exemplary embodiment of the present disclosure and illustrates a process performed by the engine controller 30.

First, as the receiver 20 receives the torque decrease request, the accumulation time of the torque decrease request is counted and the ignition timing is retarded (401 to 403).

Next, it is checked whether or not the temperature of the catalyst exceeds the threshold temperature (404).

As a result of the check (404), if the temperature of the catalyst does not exceed the threshold temperature, the method proceeds to a process of '403' to maintain the retardation of the ignition timing.

As the result of the check (404), if the temperature of the catalyst exceeds the threshold temperature, it is checked whether or not the accumulation time of the torque decrease request exceeds the threshold time (405).

As a result of the check (405), if the accumulation time of the torque decrease request does not exceed the threshold, the method proceeds to the process of '403' to maintain the retardation of the ignition timing.

As the result of the check (405), if the accumulation time of the torque decrease request exceeds the threshold, the ignition timing is advanced (406) and the amount of air and the amount of fuel supplied to the engine are further adjusted (407).

That is, the engine torque is decreased by decreasing the amount of air supplied to the engine, and the engine torque is decreased by adjusting the amount of fuel of the air fuel ratio. In this case, the adjustment of the amount of fuel includes a decrease and an increase. The reason is that the engine torque may be decreased even in a case in which the amount of fuel is decreased, and the engine torque may be decreased even in a case in which the amount of fuel is increased, as illustrated in FIG. 3.

Thereafter, when the temperature of the catalyst becomes the threshold temperature or less, the process of decreasing the engine torque for protecting the catalyst according to the present disclosure is ended (408).

Meanwhile, the method according to the present disclosure as described above may be created by a computer program. Codes and code segments configuring the computer program may be easily deduced by computer programmers in the art. In addition, the created computer program is stored in a computer readable recording medium (information storage medium) and is read and executed by computers, thereby implementing the method according to the present disclosure. In addition, the recording medium includes all forms of computer readable recording medium.

As described above, according to the exemplary embodiments of the present disclosure, the damage on the catalyst occurring upon controlling the engine torque may be prevented by controlling the engine torque based on the accumulated time of the torque decrease request from the ESC system or the TCS while monitoring the temperature of the catalyst.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An apparatus for controlling an engine of a vehicle, the apparatus comprising:
    a temperature sensor configured to sense a temperature of catalyst;
    a receiver configured to continuously receive a torque decrease request; and
    an engine controller configured to control the engine to retard an ignition timing as the torque decrease request is received through the receiver and control the engine to decrease engine torque by advancing the retarded ignition timing and adjusting an amount of air and an amount of fuel when the temperature of the catalyst exceeds a threshold temperature and an accumulation time of the torque decrease request exceeds a threshold time.

2. The apparatus according to claim 1, wherein the engine controller decreases the engine torque by decreasing the amount of air supplied to the engine.

3. The apparatus according to claim 1, wherein the engine controller decreases the engine torque by adjusting an air fuel ratio.

4. The apparatus according to claim 1, wherein the receiver receives the torque decrease request from an electronic stability control (ESC) system or a traction control system (TCS).

5. The apparatus according to claim 1, wherein the receiver receives the torque decrease request via a network of the vehicle.

6. A method for controlling an engine of a vehicle, the method comprising steps of:
    counting an accumulation time of a torque decrease request, and retarding an ignition timing of the engine upon receiving the torque decrease request;
    maintaining the retardation of the ignition timing when a temperature of catalyst does not exceed a threshold temperature, and checking whether or not the accumulation time of the torque decrease request exceeds a threshold time when the temperature of the catalyst exceeds the threshold temperature;
    maintaining the retardation of the ignition timing when the accumulation time of the torque decrease request does not exceed the threshold time as a result of the checking; and
    advancing the ignition timing and adjusting an amount of air and an amount of fuel when the accumulation time of the torque decrease request exceeds the threshold time as the result of the checking.

7. The method according to claim 6, wherein in the step of adjusting the amount of air and the amount of fuel, engine torque is decreased by decreasing the amount of air supplied to the engine.

8. The method according to claim 6, wherein in the step of adjusting the amount of air and the amount of fuel, engine torque is decreased by adjusting an air fuel ratio.

9. The method according to claim 6, wherein the torque decrease request is received from an electronic stability control (ESC) system or a traction control system (TCS).

10. The method according to claim 6, wherein the torque decrease request is received via a network of the vehicle.

* * * * *